United States Patent
Talavasek et al.

(10) Patent No.: US 11,345,437 B2
(45) Date of Patent: May 31, 2022

(54) BATTERY FOR ELECTRIC BICYCLE

(71) Applicant: Specialized Bicycle Components, Inc., Morgan Hill, CA (US)

(72) Inventors: Jan Talavasek, Knonau (CH); Marco Werner Sonderegger, Benzenschwil (CH); Jonas Reiter, Zug (CH)

(73) Assignee: SPECIALIZED BICYCLE COMPONENTS, INC., Morgan Hill, CA (US)

(*) Notice: Subject to any disclaimer, the term of this patent is extended or adjusted under 35 U.S.C. 154(b) by 333 days.

(21) Appl. No.: 16/448,855

(22) Filed: Jun. 21, 2019

(65) Prior Publication Data

US 2020/0398931 A1   Dec. 24, 2020

(51) Int. Cl.
| | |
|---|---|
| *B62M 6/90* | (2010.01) |
| *H01M 50/20* | (2021.01) |
| *B62J 11/00* | (2020.01) |
| *B62K 19/30* | (2006.01) |
| *B62M 6/40* | (2010.01) |

(52) U.S. Cl.
CPC .............. *B62M 6/90* (2013.01); *B62J 11/00* (2013.01); *B62K 19/30* (2013.01); *B62M 6/40* (2013.01); *H01M 50/20* (2021.01); *B60L 2200/12* (2013.01); *B60Y 2200/13* (2013.01)

(58) Field of Classification Search
CPC ............ B62M 6/90; B62M 6/40; B62M 6/55; H01M 50/20; H01M 2220/20; B62J 11/00; B62J 43/28; B62J 43/13; B62K 19/30; B62K 19/34; B62K 19/40; B60L 2200/12; B60L 50/64; B60Y 2200/13; Y02E 60/10; Y02T 10/70

See application file for complete search history.

(56) References Cited

U.S. PATENT DOCUMENTS

| | | | |
|---|---|---|---|
| 8,490,732 B2 * | 7/2013 | Sugimoto | ................ B62M 6/90 180/206.1 |
| 9,321,433 B2 | 4/2016 | Yin et al. | |

(Continued)

FOREIGN PATENT DOCUMENTS

| | | |
|---|---|---|
| DE | 102010005222 A1 | 7/2011 |
| EP | 1092826 A1 | 4/2001 |

(Continued)

OTHER PUBLICATIONS

Extended European Search Report issued by the European Patent Office for Application No. 20180678.3 dated Oct. 19, 2020 (10 pages).

(Continued)

*Primary Examiner* — Jacob D Knutson
*Assistant Examiner* — Marlon A Arce
(74) *Attorney, Agent, or Firm* — Micheal Best & Friedrich LLP

(57) ABSTRACT

An e-bike includes a frame assembly, wheels supporting the frame assembly, a motor assembly coupled to the frame assembly, and a battery coupled to the frame assembly. The battery includes a battery housing and a battery mount. The e-bike further includes a fastener coupling the frame assembly to the battery mount, and a resilient pad adjacent the battery mount, the resilient pad being compressed between the frame assembly and the battery housing.

20 Claims, 6 Drawing Sheets

(56) References Cited

U.S. PATENT DOCUMENTS

| | | | |
|---|---|---|---|
| 9,580,141 B2 | 2/2017 | Talavasek et al. | |
| 9,954,206 B2* | 4/2018 | Templeman | H01M 50/20 |
| 10,343,747 B2* | 7/2019 | Cunado Landa | B62K 19/40 |
| 10,518,841 B2* | 12/2019 | Talavasek | B62M 6/40 |
| 2018/0043966 A1* | 2/2018 | Cunado Landa | B62M 6/90 |
| 2018/0072379 A1* | 3/2018 | Talavasek | B62M 6/90 |
| 2018/0269439 A1 | 9/2018 | Yoneda et al. | |
| 2021/0111387 A1* | 4/2021 | Andreas | F16F 7/121 |

FOREIGN PATENT DOCUMENTS

| | | |
|---|---|---|
| GB | 401359 A | 11/1933 |
| JP | H10181651 A | 7/1998 |

OTHER PUBLICATIONS

European Exam Report issued by the European Patent Office for Application No. 20180678.3 dated Oct. 4, 2021 (7 pages).

\* cited by examiner

BATTERY FOR ELECTRIC BICYCLE

BACKGROUND

The present invention relates generally to the field of bicycles, and specifically to batteries for electric bicycles ("e-bikes").

E-bikes commonly include a frame assembly and a battery secured to the frame assembly that powers an electric motor. Some e-bikes position the battery inside the frame assembly (e.g., a frame tube of the frame assembly). Inconsistent surfaces and/or non-planar shapes inside the frame assembly, however, can decrease a reliability of an attachment of the battery and/or a repeatability of an installation of the battery. For example, the battery can be damaged and/or can rattle due to insufficient attachment of the battery to the frame assembly. Additionally, internal housings and routed cables may preload the battery in such a way that detaching the battery from the frame assembly becomes more difficult, and such that the battery is difficult to grab and remove from the frame assembly for replacement and/or recharging.

DETAILED DESCRIPTION

In some embodiments, an e-bike includes a frame assembly, wheels supporting the frame assembly, a motor assembly coupled to the frame assembly, and a battery coupled to the frame assembly. The battery includes a battery housing and a battery mount. The e-bike further includes a fastener coupling the frame assembly to the battery mount, and a resilient pad adjacent the battery mount, the resilient pad being compressed between the frame assembly and the battery housing.

In yet other embodiments, an e-bike includes a frame assembly having a frame member with an open end, wheels supporting the frame assembly, a motor assembly coupled to the frame assembly, and a battery positioned at least partially in the frame member. The battery includes a battery housing having an engagement feature integral with the battery housing and accessible from the open end of the frame member to facilitate removal of the battery from the frame member In yet other embodiments, a battery configured to be inserted into and coupled to an e-bike frame assembly includes a battery housing, a battery mount, and a resilient pad adjacent the battery mount. The resilient pad is configured to be compressed between the battery housing and the e-bike frame assembly when the e-bike battery is coupled to the e-bike frame assembly.

Other elements of the invention will become apparent by consideration of the detailed description and drawings.

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
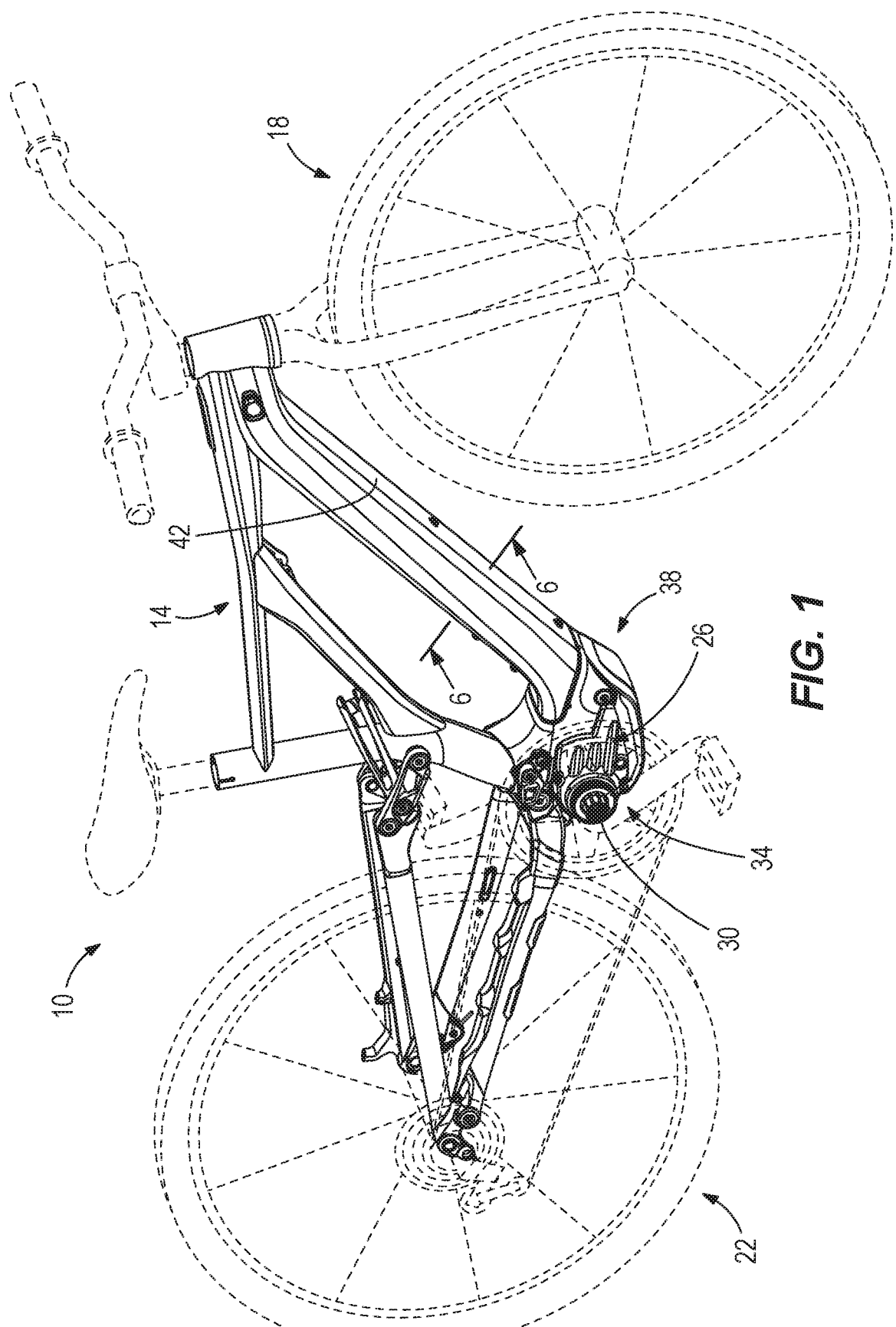
FIG. 1 is a perspective view of an e-bike, according to an embodiment.

Referring to the drawings, FIG. 1 is a perspective view of an electric bicycle ("e-bike") 10, according to an embodiment. In many embodiments, e-bike 10 can comprise a pedal-assist e-bike and/or a power-on-demand e-bike. In some embodiments, e-bike 10 can comprise a pedal-assist e-bike and not a power-on-demand e-bike, or vice versa.

In many embodiments, and as illustrated in FIG. 1, the e-bike 10 includes a frame assembly 14, a first wheel 18 coupled to and supporting the frame assembly 14, and a second wheel 22 coupled to and supporting the frame assembly 14. The e-bike 10 also includes a motor assembly 26 coupled to the frame assembly 14. The motor assembly 26 can be operable to provide motive power to the e-bike 10. For example, the motor assembly 26 can be configured to generate motive power from electricity supplied to the motor assembly 26 by a battery 46 (FIG. 2), and can supply the motive power to a drivetrain of the e-bike 10. In many embodiments, and as illustrated in FIG. 1, the motor assembly 26 can be located generally at a lower portion of the frame assembly 14 and the e-bike 10, although in other embodiments, the motor assembly 26 can be located elsewhere at the frame assembly 14 and the e-bike 10.

In many embodiments, the motor assembly 26 can include a motor output shaft 30. Further, the motor output shaft 30 can be configured to revolve in order to provide motive power to the e-bike 10. For example, the motor output shaft 30 can turn a sprocket of a drivetrain of e-bike 10.

In some embodiments, and as illustrated in FIG. 1, the motor output shaft 30 can extend laterally away from the e-bike 10 on a drive side 34 of the e-bike 10. The drive side 34 can be located opposite a non-drive side 38 of the e-bike 10. In some embodiments, and as illustrated in FIG. 1, the motor output shaft 30 can be splined, and can be coupled, for example, to a sprocket (e.g., via a spider) or other component of the e-bike 10. However, in other embodiments, different motor output shafts 30 can be implemented.

Figure 2:
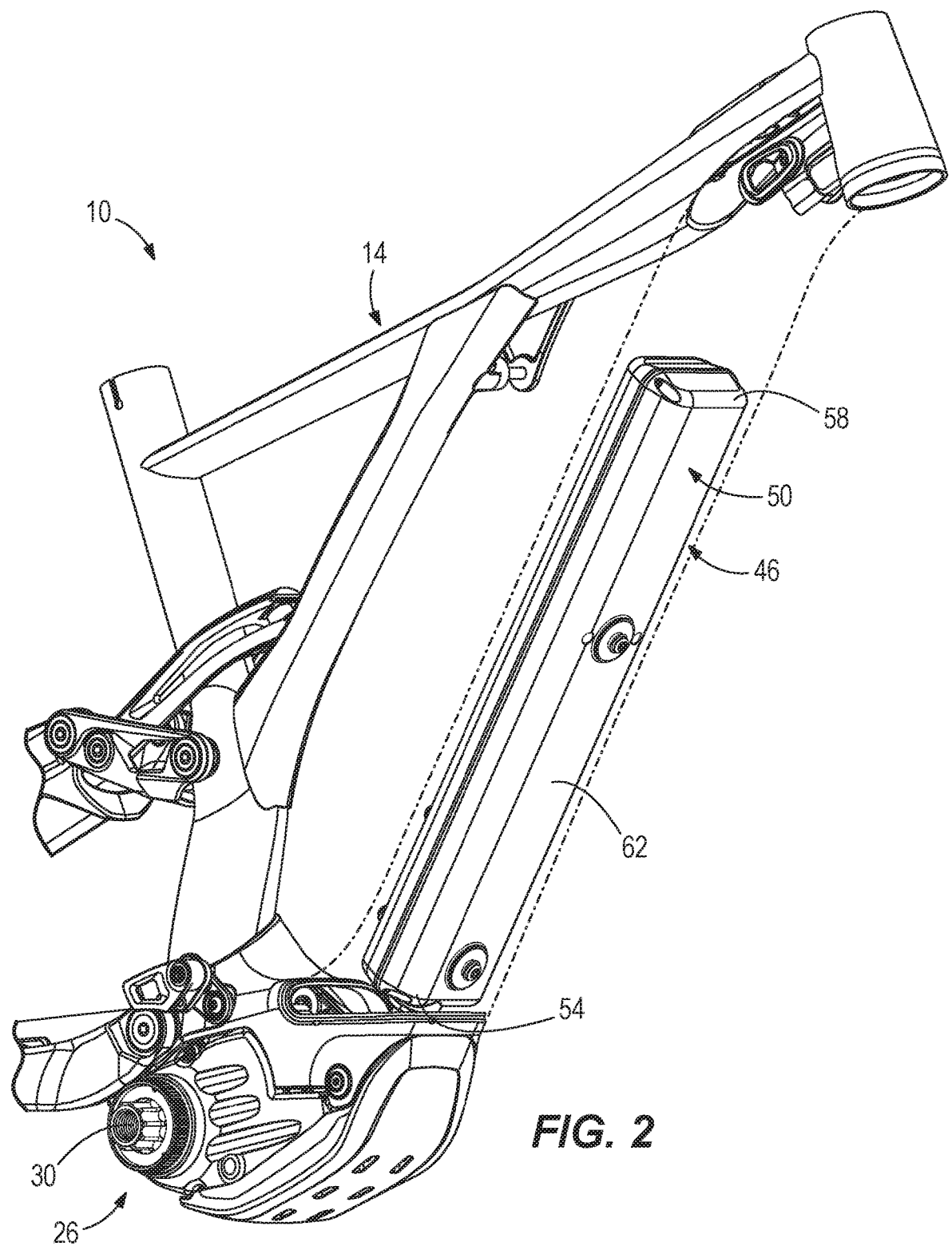
FIG. 2 is a perspective view of a frame assembly of the e-bike of FIG. 1 with a downtube removed so as to reveal a battery of the e-bike.

In many embodiments, and as illustrated in FIG. 2, the e-bike 10 includes a battery 46. As discussed further herein, the battery 46 can be coupled (e.g., permanently or removably coupled) to the frame assembly 14, such as, for example, by one or more fasteners. Further, the battery 46 can be electrically coupled (e.g., via electrical cables) to the motor assembly 26 to provide electricity to the motor assembly 26. In some embodiments, the battery 46 also may provide electricity to one or more other components of the e-bike 10 (e.g., lights, navigation, sensors, etc.).

In many embodiments, the battery 46 can be insertable (e.g., at least partially or fully insertable) into the frame assembly 14. For example, the battery 46 can be insertable (e.g., at least partially or fully insertable) into a frame member (e.g., a tube) of the frame assembly 14, such as, for example, into a cavity within the frame assembly 14 or the frame member of the frame assembly 14. In many embodiments, the battery 46 can be concealed (e.g., at least partially or fully) when the battery 46 is inserted and fully installed into the frame assembly 14 (e.g., the frame member of the frame assembly 14).

For example, referring to FIGS. 1 and 2, the frame assembly 14 can include a downtube 42 (FIG. 1). In many embodiments, the downtube 42 can extend up and/or away from the motor assembly 26. In many embodiments, and as illustrated in FIG. 2, the battery 46 can be insertable (e.g., at least partially or fully) into the downtube 42. In the illustrated embodiment, the battery 46 is entirely concealed and enclosed within the downtube 42 when fully installed, and is coupled (e.g., via electrical cables) to the motor assembly 26 to provide electricity to the motor assembly 26. In other embodiments, the battery 46 may be only partially concealed and enclosed within the downtube 42 when fully installed. Meanwhile, although the battery 46 is illustrated as being inserted into the downtube 42 in the illustrated embodiment, as discussed previously, in other embodiments, the battery 42 can be insertable into a different frame member of the frame assembly 14 (e.g., a top tube, a seat tube, etc.).

Figure 3:
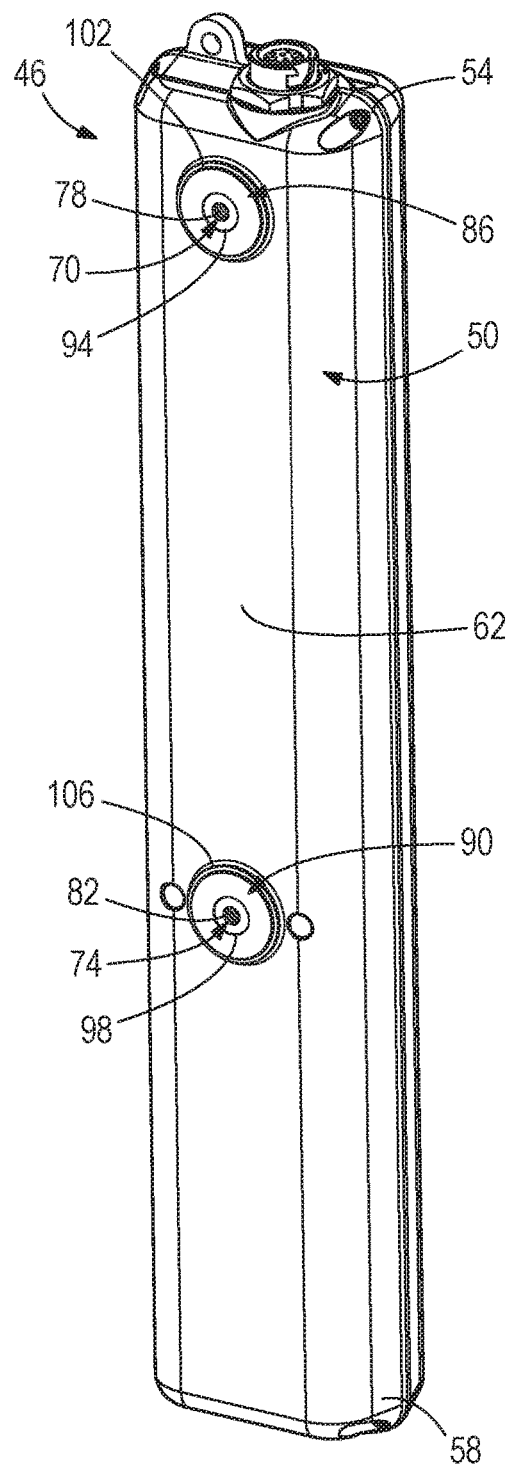
FIG. 3 is a bottom perspective view of the battery of FIG. 2.
Figure 4:
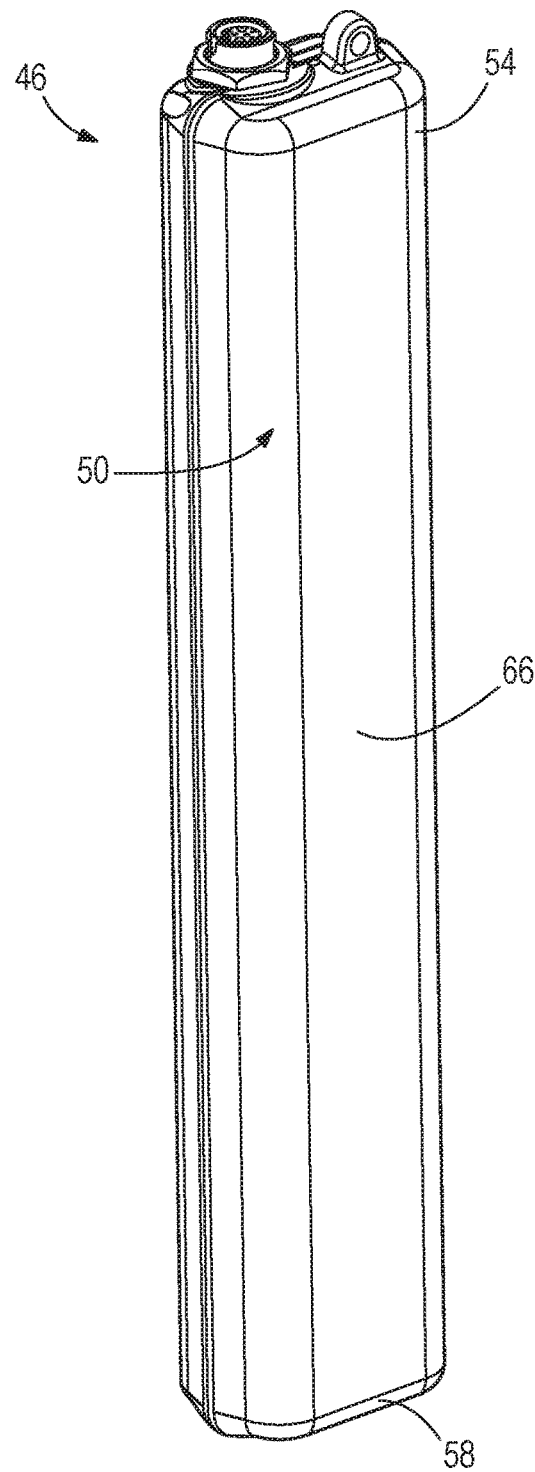
FIG. 4 is a top perspective view of the battery of FIG. 2.

Referring now to FIGS. 2-7, in many embodiments, the battery 46 includes a battery housing 50. The battery housing 50 can include a first end 54 and a second end 58 opposite the first end 54. The battery housing 50 further can include a first side 62 (e.g., a planar bottom side, as shown in FIGS. 2 and 3) disposed between the first end 54 and the second end 58, and an opposite, second side 66 (e.g., a planar upper side, as shown in FIG. 4) disposed between the first end 54 and the second end 58. Other embodiments can include different shapes and sizes for the battery housing 50 and the battery 46 overall than that illustrated. The battery housing 50 may be made of metal, plastic, and/or other suitable materials.

In many embodiments, the battery 46 can include one or more battery mounts. The battery mount(s) can be located at one or more sides of the battery 46 and/or the battery housing 50, and in some embodiments, only at one or more sides of the battery 46 and/or the battery housing 50. In some embodiments, two or more of the battery mount(s) can be similar or identical to each other. As discussed in more detail herein, the battery mount(s) can be configured to receive one or more fasteners (e.g., bolts) to couple the battery 46 to frame assembly 14. In these or other embodiments, the battery 46 can be coupled to the frame assembly 14 by an interference fit. In further embodiments, one or more or all of the battery mount(s) can be omitted.

For example, in many embodiments, and as illustrated at FIG. 3, the battery 46 can include a first battery mount 70 and/or a second battery mount 74) located along the first side 62 of the battery housing 50. The first battery mount 70 can be nearer to the first end 54 than to the second end 58, spaced from the first end 54, and/or disposed between the first end 54 and the second battery mount 74; and/or the second battery mount 74 can be nearer to the second end 58 than to the first end 54, spaced from the second end 58, and/or disposed between the first battery mount 70 and the second end 58. In some embodiments, first battery mount 70 and/or second battery mount 74 can be omitted.

In many embodiments, the battery mount(s) of the battery housing 50 each can include a metal insert that extends into the battery housing 50 and that have a threaded aperture, which may be configured to receive a fastener as further discussed herein. For example, as illustrated at FIG. 3, the first battery mount 70 can include a metal insert that extends into the battery housing 50 and has a first threaded aperture 78, and/or the second battery mount 74 can include a metal insert that extends into the battery housing 50 and has a second threaded aperture 82. In other embodiments the first battery mount 70 and/or the second battery mount 74 may include threaded protrusions, or other-shaped threaded apertures than that illustrated, or apertures or protrusions that do not include threads.

In many embodiments, the battery 46 can include one or more resilient pads, such as, for example, at an outer surface of the battery 46 or battery housing 50. The resilient pad(s) can be located at one or more sides and/or corners of the battery 46 and/or the battery housing 50, and in some embodiments, only at one or more sides or corners of the battery 46 and/or the battery housing 50. In some embodiments, two or more of the resilient pad(s) can be similar or identical to each other. In further embodiments, one or more of the resilient pad(s) can be located adjacent to (e.g., next to, directly abutting or flush with, or within a limited distance from, such as, for example, 1 millimeter, 2 millimeters, 4 millimeters, 8 millimeters, 16 millimeters, or 32 millimeters) one or more of the battery mount(s). For example, in some embodiments, each one of the resilient pad(s) can be located adjacent to a different one of the battery mount(s). In some embodiments, one or more or all of the resilient pad(s) can be omitted.

Figure 5:
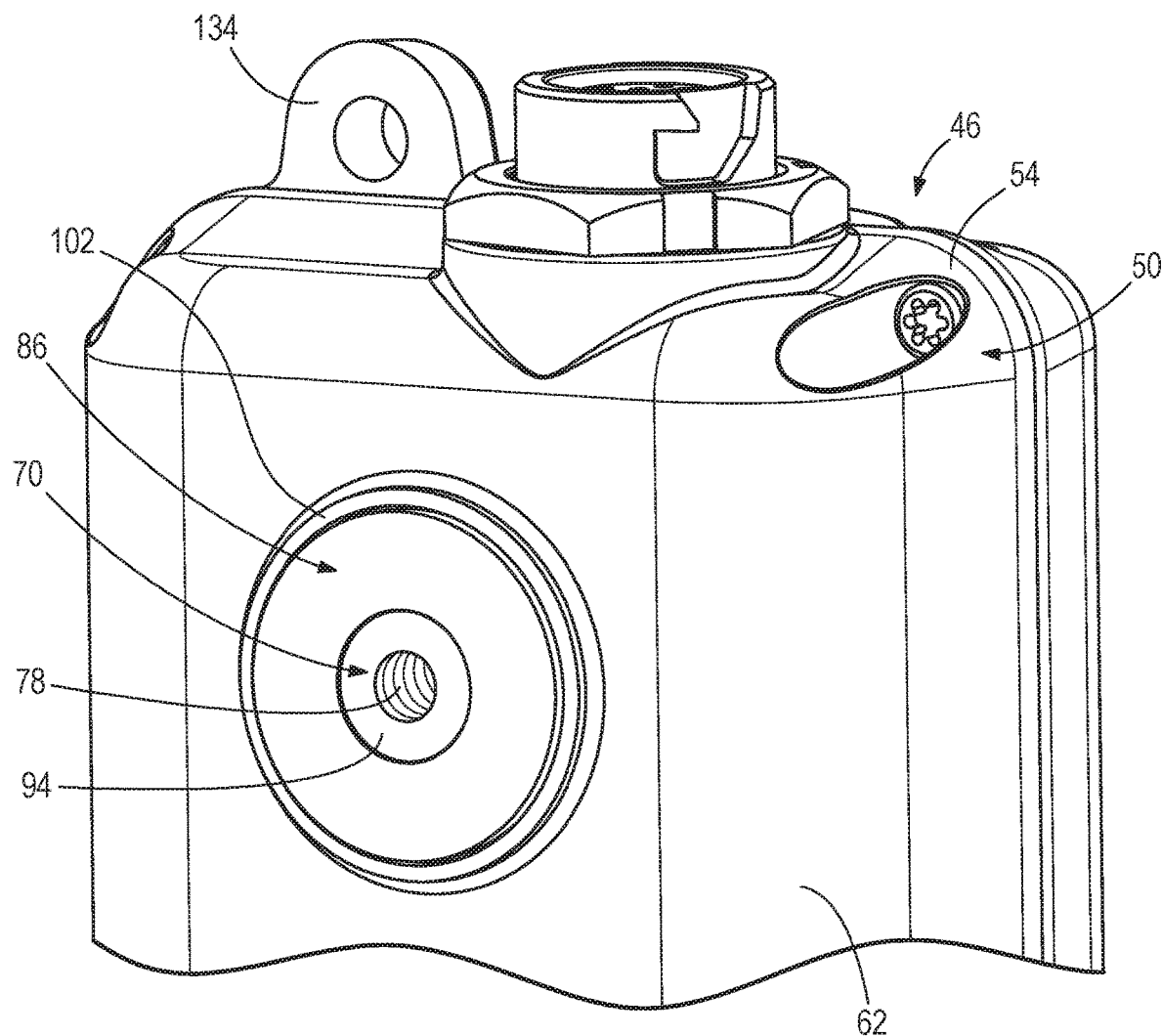
FIG. 5 is an enlarged perspective view of a portion of the battery of FIG. 2.

For example, in many embodiments, and as illustrated at FIGS. 3 and 5, the battery 46 can include a first resilient pad 86 and/or a second resilient pad 90. The first resilient pad 86 can be located adjacent to (e.g., next to, directly abutting or flush with, or within a limited distance from, such as, for example, 1 millimeter, 2 millimeters, 4 millimeters, 8 millimeters, 16 millimeters, or 32 millimeters) the first battery mount 70; and/or the second resilient pad 90 can be located adjacent to (e.g., next to, directly abutting or flush with, or within a limited distance from, such as, for example, 1 millimeter, 2 millimeters, 4 millimeters, 8 millimeters, 16 millimeters, or 32 millimeters) the second battery mount 74. In many embodiments, the second resilient pad 90 can be similar or identical to the first resilient pad 86.

In many embodiments, the first resilient pad 86 comprises a generally thin, circular, disk-shaped pad defining a first central opening 94. In other embodiments, the first resilient pad 86 and/or the first central opening 94 can have a non-circular shape, and/or a shape other than a disk (e.g., a more rounded shape, or a shape having concave and/or convex surfaces). In many embodiments, the first resilient pad 86 completely surrounds and is concentric about the first battery mount 70 at an outer surface of the battery 46 and/or the battery housing 50. In other embodiments, the first resilient pad 86 only partially surrounds (e.g., substantially surrounds) the first battery mount 70, and/or is non-concentric about the first battery mount 70. In many embodiments, the first resilient pad 86 may be made of an elastic or other resilient material (e.g., rubber). In further embodiments, the resilient material can be more resilient than a material of the battery housing 50.

Further, in these or other embodiments, the second resilient pad 90 comprises a generally thin, circular, disk-shaped pad defining a second central opening 98 in a middle of the pad. In other embodiments, the second resilient pad 90 and/or the second central opening 98 can have a non-circular shape, and/or a shape other than a disk (e.g., a more rounded shape, or a shape having concave and/or convex surfaces). In many embodiments, the second resilient pad 90 completely surrounds and is concentric about the second battery mount 74 at the outer surface of the battery 46 and/or the battery housing 50. In other embodiments, the second resilient pad 90 only partially surrounds (e.g., substantially surrounds) the second battery mount 74, and/or is non-concentric about the second battery mount 74. In many embodiments, the second resilient pad 90 may be made of an elastic or other resilient material (e.g., rubber). In further embodiments, the resilient material can be more resilient than a material of the battery housing 50.

The first resilient pad 86 and the second resilient pad 90 may be attached separately to the battery housing 50 (e.g., with adhesive or fasteners), or may be formed with the battery housing 50 (e.g., co-molded). In some embodiments, and as illustrated at FIG. 3, the first resilient pad 86 and the second resilient pad 90 are positioned along a common side (e.g., the first side 62) of the battery housing 50, and not along any other sides or portions of the battery housing 50. For example, in the illustrated embodiment, the battery 46 does not include resilient pads along the second side 66, or along any corners of the battery housing 50. In other embodiments, the battery 46 may include resilient pads along multiple sides or locations (e.g., along both the first side 62 and the second side 66, and/or along corners of the battery 46).

In many embodiments, the first central opening 94 and/or the second central opening 98 have a diameter of from 9 millimeters-13 millimeters, and the first threaded aperture 78 and/or the second threaded aperture 82 have a diameter of from 4 millimeters-6 millimeters. Additionally, the first resilient pad 86 and/or the second resilient pad 90 have an outer diameter of from 35 millimeters-45 millimeters, and/or have a thickness of from 1 millimeter-3 millimeters. The first resilient pad 86 and/or the second resilient pad 90 have a combined surface area that is less than a surface area of the remainder of first side 62, although, in other embodiments, the resilient pads on the first side 62 may have a combined surface area that is greater than a remainder of the surface area of the first side 62. Other embodiments include different values and ranges of values than that illustrated.

In many embodiments, the battery housing 56 can include one or more projecting lips. The projecting lip(s) of the battery housing 56 can be located adjacent to (e.g., next to, directly abutting or flush with, or within a limited distance from, such as, for example, 1 millimeter, 2 millimeters, 4 millimeters, 8 millimeters, 16 millimeters, or 32 millimeters) and/or can surround (e.g., partially or fully, discontinuously or continuously surround) the resilient pad(s) of the battery 46. In some embodiments, two or more of the projecting lip(s) can be similar or identical to each other. In some embodiments, one or more or all of the projecting lip(s) can be omitted.

For example, in many embodiments, and as illustrated at FIGS. 3 and 5, the battery housing 50 can include a first projecting lip 102 that circles entirely around the first resilient pad 86, and a second projecting lip 106 that circles entirely around the second resilient pad 90. In other embodiments, the first projecting lip 102 and/or the second projecting lip 106 can be omitted.

In many embodiments, the e-bike 10 can include one or more fasteners (e.g., bolts, screws, etc.). The fastener(s) of the e-bike 10 can be received at and coupled to the battery mount(s) of the battery housing 50 in order to couple the battery 46 to the frame assembly 14. In some embodiments, two or more of the fastener(s) can be similar or identical to each other. In some embodiments, one or more or all of the fastener(s) can be omitted.

Figure 6:
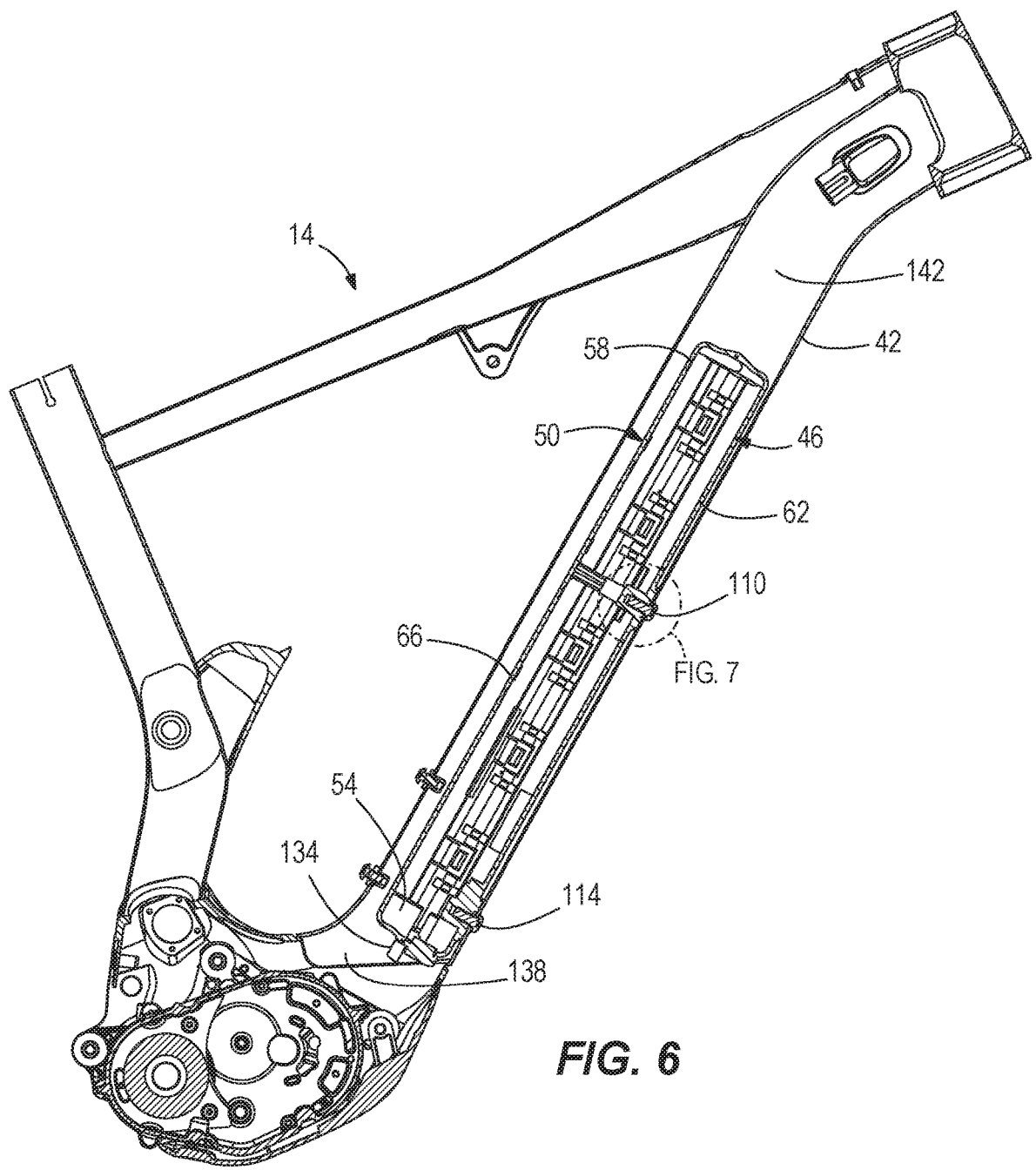
FIG. 6 is a cross-sectional view of a portion of the e-bike of FIG. 1.
Figure 7:
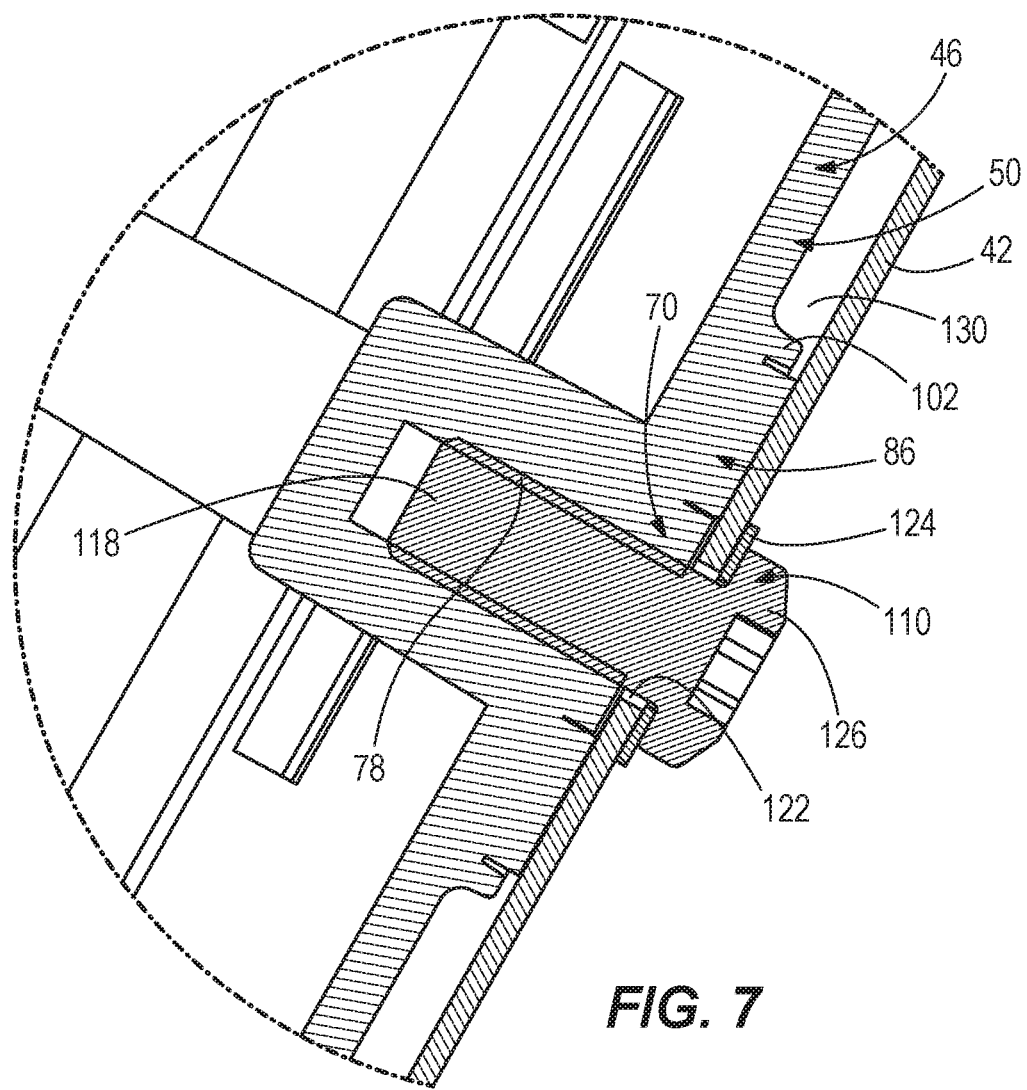
FIG. 7 is an enlarged portion of the cross-sectional view of FIG. 6.

For example, in many embodiments, and as illustrated at FIGS. 6 and 7, the e-bike 10 can include a first fastener 110 (e.g., bolt) and/or a second fastener 114 (e.g., bolt) that couple the frame assembly 14 to the battery 46 (e.g., to the battery mounts 70, 74, respectively). In many embodiments, and as illustrated in FIG. 7, a body 118 of the first fastener 110 may be inserted through an opening 122 of the downtube 42, with a head 126 of the fastener 110 remaining outside the downtube 42. In some embodiments, a washer 124 also may be provided. The fastener 110 is threaded into the first battery mount 70 (i.e., into the first threaded aperture 78), until the first resilient pad 86 is pulled tightly up against an interior surface of the downtube 42 and compresses between the battery housing 50 and the interior surface of the downtube 42. Similarly, the second fastener 114 also may be tightened, so as to compress the second resilient pad 90 between the battery housing 50 and the interior surface of the downtube 42. This tightening and compression can secure the battery housing 50 in close proximity to the downtube 42, while still leaving a slight gap 130 between the battery housing 50 and the interior surface of the downtube 42. Thus, in some embodiments, the battery housing 50 does not contact the frame assembly 14 (FIG. 1) and/or the downtube 42. Rather, only the compressed first and second resilient pads 86, 90 contact the downtube 42 when the battery 46 has been fully installed. Other embodiments include different fasteners 110, 114 (e.g., screws, etc.) than that illustrated.

In these or other embodiments, the battery 46 can be sized and/or shaped to be smaller than an inside volume of the downtube 42 such that when the battery 46 is initially installed (prior to compressing the first and second resilient pads 86, 90), the second side 66 of the battery 46 is not in contact with the downtube 42. The size of the battery 46, as well as the location of the first and second resilient pads 86, 90, thus helps prevent pre-loading of the battery 46 during installation, while also reducing friction to facilitate removal of the battery 46.

In many embodiments, the battery 46 can include an engagement feature. The engagement feature can facilitate insertion and/or removal of the battery 46 from the frame assembly 14, such as, for example, through an opening in the frame assembly 14. In other embodiments, the engagement feature can be omitted.

For example, in many embodiments, and as illustrated at FIGS. 5 and 6, the battery 46 can include an engagement feature 134. The engagement feature 134 can be accessible from a lower, open end 138 of the downtube 42 to facilitate insertion and/or removal of the battery 46 from the downtube 42. In many embodiments, the engagement feature 134 can be integrated with the battery housing 50 as one piece (e.g., formed together or co-molded), can be immovable relative to the battery housing 50 (i.e., is fixed in place), and/or can be an eyelet sized and shaped to receive a tool (e.g., a hook-shaped tool) that may be used to pull the battery 46 from (or insert the battery 46 into) the lower, open end 138 of the downtube 42, such as, for example, when the motor assembly 26 has been removed or the downtube 42 is otherwise opened. In these or other embodiments, the tool may be sized to be small enough to enter the lower, open end 138 of the downtube 42. When the battery 46 is fully installed within the downtube 42, the engagement feature 134 may be located adjacent to and/or closer to the lower, open end 138 of the downtube 42 than to an opposite, closed end 142 of the downtube 42.

In other embodiments the engagement feature 134 can be separately coupled to the battery housing 50 (e.g., via a fastener). In these or other embodiments, the engagement feature 134 can be movable relative to the battery housing 50 (e.g., can rotate about one or more axes). In many embodiments, the engagement feature 134 may have a size and/or shape other than that illustrated, or may be a feature other than an eyelet (e.g., a hook, protruding ledge, or any other feature that facilitates grasping and pulling of the battery 46 via a tool). The engagement feature 134 may be used, for example, to pull the battery 46 out of the downtube 42 when the battery 46 is otherwise stuck (e.g., if cables have wedged between the downtube 42 and the battery 46).

Although e-bike 10 is described as being an electric bicycle, in other embodiments, one or more of the elements of e-bike 10 could be applied to a non-electric bicycle, such as, for example, a non-electric bicycle having an internal battery to electrically power one or more components of the non-electric bicycle (e.g., lights, navigation, sensors, etc.).

Various features of the invention are set forth in the following claims.

The invention claimed is:

1. An e-bike comprising:
   a frame assembly;
   wheels supporting the frame assembly;
   a motor assembly coupled to the frame assembly;
   a battery coupled to the frame assembly, the battery including a battery housing and a battery mount, wherein the battery mount is located along a side of the battery housing, wherein the battery mount defines an aperture;
   a fastener extending into the aperture and coupling the frame assembly to the battery mount; and
   a resilient pad located adjacent the battery mount and in contact with an exterior surface of the battery housing, wherein the resilient pad extends at least partially around the aperture and is compressed between the frame assembly and the battery housing.

2. The e-bike of claim 1, wherein the resilient pad is disk-shaped.

3. The e-bike of claim 2, wherein the resilient pad completely surrounds the battery mount.

4. The e-bike of claim 1, wherein:
   the battery mount is a first battery mount;
   the battery further includes a second battery mount spaced apart from the first battery mount;
   the resilient pad is a first resilient pad adjacent the first battery mount; and
   the e-bike further includes a second resilient pad adjacent the second battery mount.

5. The e-bike of claim 4, wherein the second resilient pad at least partially surrounds the second battery mount.

6. The e-bike of claim 4, wherein the first resilient pad completely surrounds the first battery mount and the second resilient pad completely surrounds the second battery mount.

7. The e-bike of claim 4, wherein the first resilient pad and the second resilient pad are positioned along a common side of the battery housing.

8. The e-bike of claim 7, wherein only the common side of the battery housing includes resilient pads positioned along the battery housing.

9. The e-bike of claim 4, wherein:
   the battery is elongate and extends along a longitudinal axis, wherein the battery includes a first end and a second end opposite the first end and spaced from the first end along the longitudinal axis; and
   the first resilient pad and the second resilient pad each are spaced away from the first end and the second end.

10. The e-bike of claim 1, wherein the battery housing includes a housing material that is less resilient than a pad material of the resilient pad, and wherein the pad material is in direct contact with both the exterior surface of the battery housing and an interior surface of the frame assembly.

11. An e-bike comprising:
   a frame assembly having an elongate frame member extending along a longitudinal axis, the elongate frame member having an open end;
   wheels supporting the frame assembly;
   a motor assembly coupled to the frame assembly; and
   a battery positioned at least partially in the frame member, the battery including a battery housing having an engagement feature accessible from the open end of the frame member to facilitate removal of the battery through the open end of the frame member along the longitudinal axis, wherein the engagement feature is configured to receive a tool to facilitate removal of the battery from the frame member, wherein the engagement feature is an eyelet, and wherein the tool includes a hook-shaped tool.

12. The e-bike of claim 11, wherein:
   the engagement feature is integrated with the battery housing as one piece; and
   the engagement feature is immovable relative to the battery housing.

13. The e-bike of claim 11, wherein the frame member includes a downtube, and the open end includes a lower end of the downtube.

14. An e-bike battery configured to be inserted into and coupled to an e-bike frame assembly, the e-bike battery comprising:
   a battery housing;
   a battery mount located along a side of the battery housing, wherein the battery mount defines an aperture sized and shaped to receive a fastener; and
   a resilient pad located adjacent the battery mount and in contact with an exterior surface of the battery housing, wherein the resilient pad extends at least partially around the aperture, and is configured to be compressed between the battery housing and the e-bike frame assembly when the e-bike battery is coupled to the e-bike frame assembly with the fastener.

15. The e-bike battery of claim 14, wherein the resilient pad is disk-shaped.

16. The e-bike battery of claim 14, wherein:
   the battery mount is a first battery mount;
   the e-bike battery further includes a second battery mount spaced apart from the first battery mount;
   the resilient pad is a first resilient pad adjacent the first battery mount; and
   the e-bike battery further includes a second resilient pad adjacent the second battery mount.

17. The e-bike battery of claim 14, wherein the battery housing includes a housing material that is less resilient than a pad material of the resilient pad, and wherein the pad material is in direct contact with both the exterior surface of the battery housing and an interior surface of the frame assembly.

18. The e-bike battery of claim 14, further comprising an engagement feature adjacent one end of the e-bike battery to facilitate removal of the e-bike battery from the e-bike frame assembly, wherein the engagement feature is configured to receive a tool to facilitate removal of the e-bike battery from the e-bike frame assembly.

19. The e-bike of claim 1, wherein the aperture of the battery mount is a threaded aperture, and wherein the fastener extends through the frame assembly and into the threaded aperture to couple the frame assembly to the battery mount.

20. The e-bike battery of claim 14, wherein the aperture of the battery mount is a threaded aperture, such that the fastener is configured to extend through the frame assembly and into the threaded aperture to couple the frame assembly to the battery mount.

* * * * *